United States Patent Office 3,443,215
Patented May 6, 1969

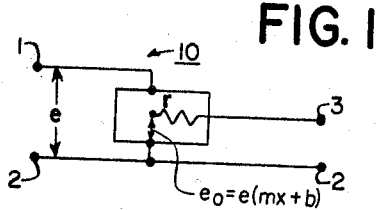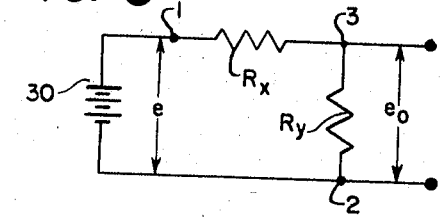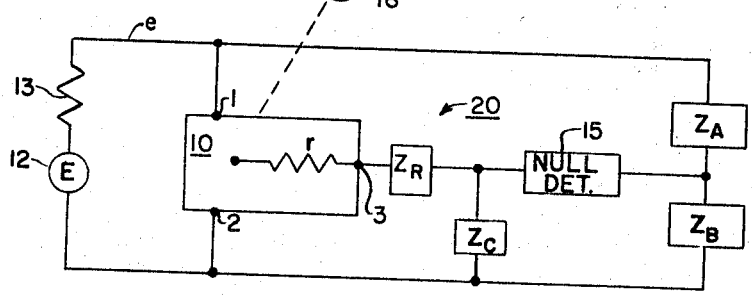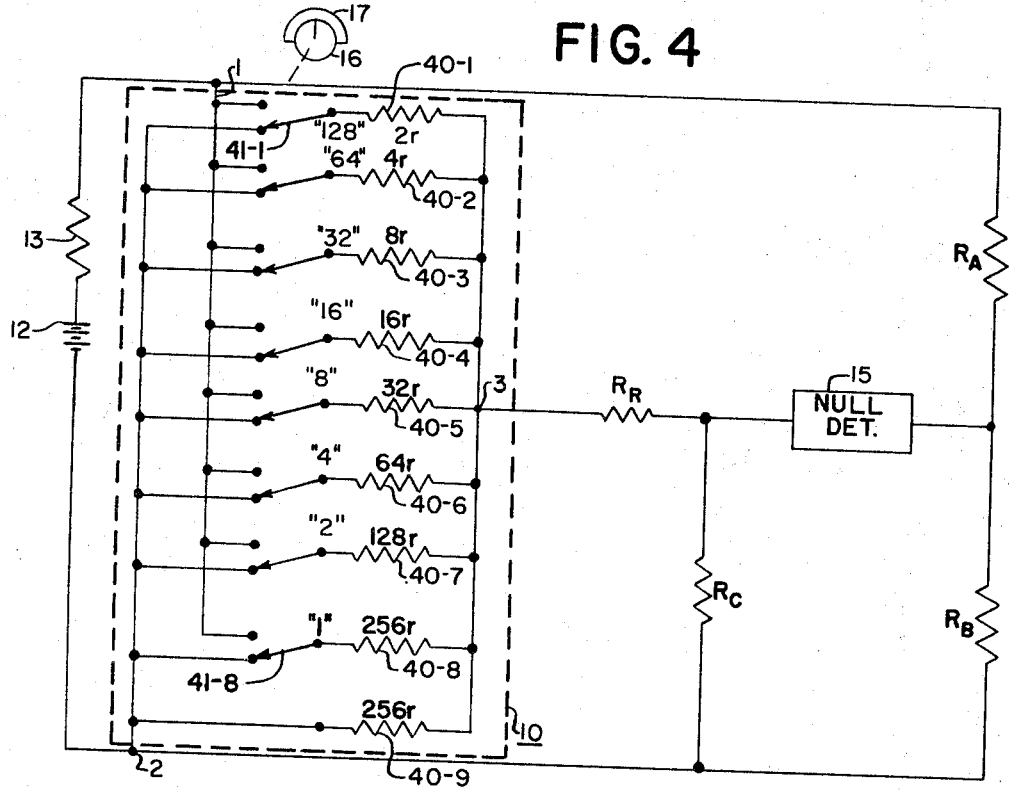

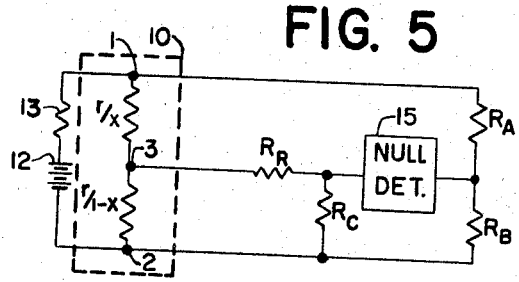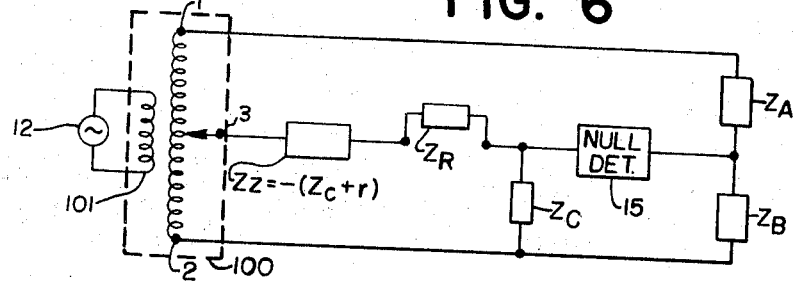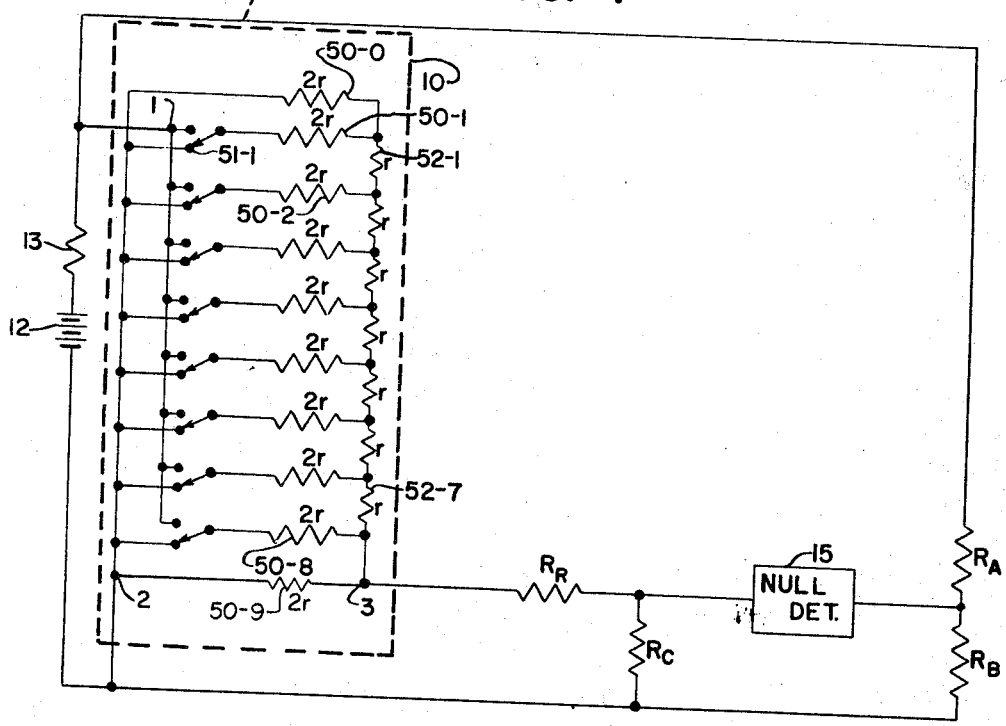

3,443,215
IMPEDANCE MEASURING BRIDGE WITH VOLTAGE DIVIDER PROVIDING CONSTANT SOURCE IMPEDANCE TO BRIDGE
Frank R. Bradley, 9 Dash Place,
Bronx, N.Y. 10463
Filed Sept. 15, 1965, Ser. No. 487,465
Int. Cl. G01r 27/02, 17/10
U.S. Cl. 324—57                    20 Claims

ABSTRACT OF THE DISCLOSURE

A bridge circuit for measuring impedances in which the variable arm of the bridge is formed by a voltage divider having a constant output impedance. The voltage divider provides a linear output voltage transfer relationship between its input and output voltage for any ratio setting of the divider.

---

This invention relates to impedance measuring devices and more particularly to impedance measuring devices of the bridge circuit type using a voltage divider in one of the bridge arms calibrated in terms of a linear scale factor.

One widely known device used for measuring impedance is the so-called Wheatstone bridge circuit, or one of the many modifications thereof, which measures an unknown impedance by the use of a null balance technique. In the typical Wheatstone bridge circuit, for example where a resistance is to be measured, two resistors of known values ($R_A$ and $R_B$) form one branch of the bridge and a resistor of unknown value ($R_R$) and a calibrating resistor ($R_C$) form the other branch. A null detecting device is connected between the junction of $R_A$ and $R_B$ and the junction of $R_R$ and $R_C$ while a voltage source is connected across the other two junctions. In operating the bridge, the calibrating resistance is adjusted until a null condition is achieved and the value of the unknown resistance is determined by the familiar equation:

$$R_R = R_C \frac{R_B}{R_A}$$

The accuracy of bridge circuits of the foregoing type is limited by the accuracy of the calibrating resistance. Where a simple rheostat is used as the calibrating resistance, the varying resistance of the rheostat contacts limits the bridge accuracy. Where a potentiometer is used, in which the end taps of the main resistance winding of the potentiometer are connecter to adjacent arms of the bridge, a non-linearity problem arises in portions of the bridge operating range.

In typical bridge circuits of the foregoing type, the voltage supply has some finite impedance, which is usually relatively low. Since the voltage supply is connected across the branch of the bridge containing the unknown resistor $R_R$ and the calibrating resistor $R_C$, both of whose impedances vary, the null detector connected in the bridge circuit sees a varying output impedance in accordance with the variation of these two impedances.

The present invention is directed to an improved bridge circuit which eliminates the need for rheostat devices for the calibrating resistance and also provides the null detector with a more constant impedance to connect to over the normal operating range of the bridge. In accordance with the invention a voltage divider is utilized as the variable element of the bridge for adjusting the circuit to achieve the null balance condition. Such dividers can be constructed with higher degrees of accuracy by using fixed value high accuracy resistors. Also, these voltage dividers are not subject to the same errors as the rheostats considered above.

The voltage divider used in the present invention is a three terminal device having two terminals connected across the voltage source and one of these two terminals and another terminal connected to the bridge circuit. The construction of the voltage divider is such that it provides a linear output voltage transfer relationship between its input and output voltage for any ratio setting of the divider. Also, for any voltage division ratio setting of the divider, a substantially constant impedance exists at its output terminals. Therefore, connection of the divider into the bridge reduces the normal impedance variation that the null detector sees and thereby improves the bridge operation.

It is therefore an object of the present invention to provide improved bridge measuring circuits.

An additional object is to provide an improved bridge circuit using a voltage divider producing a substantially constant voltage source impedance to a portion of the bridge.

A further object is to provide an impedance measuring bridge in which a voltage divider network is used to produce a substantially linear voltage transfer relationship between its input and output.

Other objects and advantages of the present invention will become more apparent upon reference to the following specification and annexed drawings in which:

FIGURE 1 is a schematic diagram showing the general principles of the voltage divider networks useful with the bridges of the present invention;

FIGURE 2 is a schematic diagram showing the general operating principles of an impedance bridge using the voltage divider network of FIGURE 1;

FIGURE 3 is a diagram illustrating certain features of the network of FIGURE 1;

FIGURE 4 is a schematic diagram of a bridge using a binary weighted voltage divider network;

FIGURE 5 is the equivalent circuit of the bridge of FIGURE 4 illustrating the derivation of the bridge balance equations;

FIGURES 6 and 6A are diagrams of bridges having provision for the elimination of the offset error; and FIGURES 7 and 8 are schematic diagrams of bridges utilizing other types of divider networks.

Figure 6A:
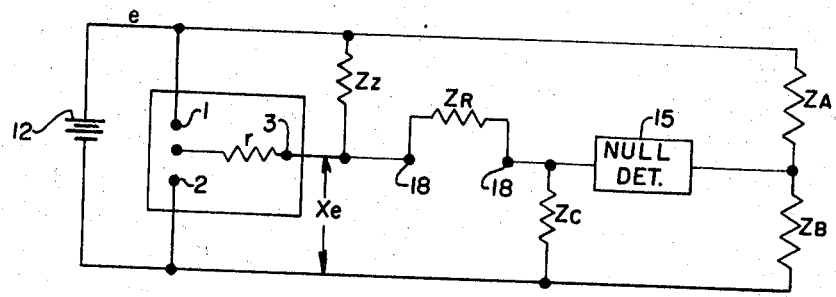

FIGURE 1 illustrates in general form the type of voltage divider 10 to be used with the present invention. The divider 10 is a three (four) terminal network and has a pair of input terminals 1 and 2, the latter terminal 2 being common and serving as one of a pair of output terminals 2 and 3. Divider 10 is constructed with one or more fixed or variable impedances therein which can be adjusted and/or interconnected by any suitable means (not shown in FIG. 1) in a manner such that when the impedances of divider 10 are set to produce any particular voltage division ratio X between the input and output terminals, where X is any number between zero and one, for example, and a voltage $e$ is applied to input terminals 1 and 2, the output voltage $e_0$ across output terminals 2 and 3 varies as a linear function of $e$ given by:

(1)                    $e_0 = e(mX + b)$

Here, $m$ is the slope of the straight line function and $b$ is the zero intercept on the abscissa of a cartesian coordinate ($x-y$) graph. Both $m$ and $X$ are determined by the components and connections of network 10.

The divider 10 is also constructed so that voltage $e_0$ of (1) has a fixed source impedance $r$ looking into terminals 2 and 3 for any ratio setting X of the divider.

The impedance $r$ is also determined by the design of the network 10. Another way of describing the characteristics of divider 10 is that when the input terminals 1 and 2 are shorted, the impedance measured between output terminals 2 and 3 or terminals 1 and 3 is constant independent of the ratio setting X.

Many types of suitable dividers having these characteristics are currently in use including those commonly called conductance dividers. Several dividers suitable for use with the present invention are described in detail below.

FIG. 2 shows the constant impedance source network 10 of FIG. 1 connected into a bridge 20 of the so-called Wheatstone type. Here the main voltage source 12 is designated as producing an output voltage E and has an internal source impedance 13. The input terminals 1 and 2 of the three terminal network 10 are connected across the upper end of the impedance 13 and the lower end of source 12. The effective voltage supplied to the input terminals 1 and 2 of divider 10, after the voltage drop across impedance 13 is considered, is designated as $e$. Source 12 represents either an alternating current (AC) or direct current (DC) voltage. A control knob 16 adjacent a linear calibrated scale 17 is provided to change the voltage division ratio X of network 10.

The remainder of the bridge 20 comprises the two impedance arms $Z_A$ and $Z_B$ each of known value connected in series as one branch of the bridge across input terminals 1 and 2 of network 10 and having a voltage $e$ applied thereacross. Another impedance $Z_C$ of known value and the unknown impedance $Z_R$ whose value is to be determined by the bridge are the other two bridge arms and are connected as the other branch of the bridge in series across the output terminals 2 and 3 of network 10 and have voltage $e_0$ thereacross. The more generalized impedance notations Z are used here for the bridge arms instead of the notation R for pure resistance but it should be understood that the discussion presented below applies equally as well to the use of resistors for the impedances.

A null detector 15 is connected between the junctions of the pairs of impedances $Z_A$ and $Z_B$ and $Z_C$ and $Z_R$ to indicate the null balance condition of the bridge in the well known manner when the voltage drops across the pair of upper or lower arms of both branches of the bridge are the same. Where a DC source is used and the impedances $Z_A$, $Z_B$, $Z_C$ and $Z_R$ are purely resistive, null detector 15 is a simple ammeter type circuit which may have an amplifier connected thereto, as desired. If source 12 produces an AC voltage and the impedances are complex quantities null detector 15 also contains suitable circuits for rectifying the AC voltage to operate the ammeter.

During operation of the bridge the voltage drop across $Z_C$ is given as:

$$(2) \qquad e(mX+b)\frac{Z_o}{Z_R+Z_o+r}$$

while the voltage across $Z_B$ is given as:

$$(3) \qquad e\frac{Z_B}{Z_A+Z_B}$$

When the bridge is balanced there is no current flow through null detector 15 and the voltages across impedances $Z_C$ and $Z_B$ are equal. This means that:

$$(4) \qquad e(mX+b)\frac{Z_o}{Z_R+Z_o+r}=e\frac{Z_B}{Z_A+Z_B}$$

Solving for $Z_R$ gives:

$$(5) \qquad Z_R=X(m)\frac{(Z_A+Z_B)Z_o}{Z_B}+\frac{b(Z_A+Z_B)Z_o}{Z_B}-(Z_o+r)$$

which when factored produces:

$$(6) \qquad Z_R=\frac{(Z_A+Z_B)Z_o}{Z_B}\left[x(m)+b-\frac{(Z_o+r)Z_B}{(Z_A+Z_B)Z_o}\right]$$

In the right hand side of Equation 6, X is a controllable variable of the divider 10 and all of the other values of $Z_A$, $Z_B$, $Z_C$, $m$, $r$ and $b$ are fixed and known, the latter three $m$, $r$ and $b$ being determined by the design of the divider. Equation 6 can therefore be rewritten as:

$$(7) \qquad Z_R=m_1X+b_1$$

where $$m_1=\frac{(Z_A+Z_B)Z_o}{Z_B}$$

and is called the scale factor, and $$b_1=b-\frac{(Z_o+r)Z_B}{(Z_A+Z_B)Z_o}$$

and is called the offset.

Using Equation 7 it should be clear that the value of $Z_R$ can be readily determined in terms of the ratio X of the voltage divider network. This value is calibrated on the scale 17 adjacent the voltage divider control knob 16. It should be clear that when $Z_R=0$ that X is not zero due to the offset factor $b_1$. A bridge arrangement for eliminating the offset factor is described below.

Where the bridge 20 of FIGURE 2 is of DC construction, source 12 is made a DC source and impedances $Z_A$, $Z_B$, $Z_C$ and $Z_R$ are now $R_A$, $R_B$, $R_C$, and $R_R$. Equation 6 can be rewritten using these terms so that:

$$(7a) \qquad R_R=m_1X+b_1$$

Here again, scale 17 is preferably linearly calibrated in terms of $R_R$ so that it may be directly indicated by the scale reading when the bridge is balanced.

As should be clear from FIGURE 2, the branch of the bridge containing $Z_R$ and $Z_C$ looks into terminals 2 and 3 of the network. Since $Z_C$ is constant and $r$ is constant, the only impedance variation that the null detector input connected to this branch sees is that of $Z_R$. In the other branch of the bridge $Z_A$ and $Z_B$ are fixed impedances having the fixed impedance 13 thereacross. Therefore, the null detector 15 sees relatively little impedance variation, that produced by $Z_R$, over the normal operating range of the bridge. This variation is to be compared to the prior art bridge circuits where the output impedance of network 10 and/or $Z_C$ are permitted to vary in addition to $Z_R$. The bridge circuit of the present invention permits a better impedance match to be selected for the detector 15 in the first instance. Also, the sensitivity of the detector is more constant over its operating range since its input sees a more constant impedance.

FIGURE 3 illustrates the general principles of one type of constant source impedance divider 10 useful with the present invention showing pure resistive elements. A similar analysis to that presented below can be made for complex impedance elements. Here a voltage $e$ from a source 30 is applied across the input terminals 1 and 2 of a network formed by two resistors $R_x$ and $R_y$ connected in series across the source. The output voltage $e_0$ is taken from terminals 2 and 3 across resistor $R_y$. Resistors $R_x$ and $R_y$ each represent any given number of resistors connected in parallel in each of the $R_x$ and $R_y$ branches from zero to the maximum number of resistors available in the network. The output voltage $e_0$ is given in FIGURE 3 by:

$$(8) \qquad e_0=e\frac{R_y}{R_x+R_y}=e\frac{R_yR_x}{R_x+R_y}\cdot\frac{1}{R_x}$$

The factor $$\frac{R_yR_x}{R_x+R_y}$$

in (8) is the value of $R_x$ and $R_y$ in parallel which is the value of all of the resistances of the network in parallel. This would be produced when input terminals 1 and 2 were shorted together. Since this is a constant, the factor is desiginated as $R_0$.

The factor $1/R_x$ in (8) can also be represented as:

(9) $$\frac{1}{R_x}=\left(\frac{1}{AR}+\frac{1}{BR}+\cdots+\frac{1}{DR}+\cdots\frac{1}{NR}\right)$$

where R is a resistance value and A, B ... D ... N are integers. Equation 9 gives the reciprocals of the resistance placed into the $R_x$ arm of the network. Equation 8 now becomes in terms of $e_0$.

(10)
$$e_0=eR_0\cdot\frac{1}{R_x}=e\left(\frac{R_0}{R}\left(\frac{1}{A}+\frac{1}{B}+\cdots\frac{1}{D}+\cdots\frac{1}{N}\right)\right)$$

Since for any given network of FIGURE 3 $R_0$ is known and R is a constant, values of A, B, C, D ... N can be selected to produce a straight line output voltage function $e_0$ in response to an input voltage $e$. FIGURE 4 shows a specific application of a network of the general type shown in FIGURE 3 useful with the present invention which indicates how the other design criterion for network 10, that the impedance between the pairs of terminals 1 and 3 and 2 and 3 be a constant irrespective of the positions and connections of the resistors therein when terminals 1 and 2 are shorted, is satisfied.

In FIGURE 4, a number of binary weighted resistors 40-1 through 40-8 are provided each having one end connected to a respectively numbered switch 41-1 through 41-8. The other end of each of these resistors is connected to output terminal 3 of the network. When a switch 41 is in the "down" position shown, the respectively connected resistor 40 is connected across terminals 2 and 3 of network 10. This corresponds to the connection of the resistor in the branch designated $R_y$ in FIGURE 3 across which $e_0$ is taken. When a switch 41 is in the "up" position, the respectively connected resistor 40 is between terminals 1 and 3. This corresponds to the connection of the resistor in the branch designated $R_x$ in FIGURE 3. The values of resistors 40-1 through 40-8 increase in binary fashion by successive powers of the number 2, shown as $2r$, $4r$ ... $256r$. Here, $r$ is to be the series source impedance of FIGURE 1. A fixed resistor 40-9 of value $256r$ is connected between terminals 2 and 3 in the $R_y$ arm.

It can be shown that the parallel connection ($R_0$) of all resistors 40 of FIGURE 4 is equal to $r$. It should also be clear that this parallel value $r$ exists between the pairs of terminals 1 and 2 and 2 and 3 when terminals 1 and 2 are shorted irrespective of the connection of any of the switches 41. Further, by operating the switches 41 in a binary arrangement corresponding to an eight bit binary number, $e_0$ can be made to vary in a straight line function from $1/256$ to $255/256$ of the input voltage $e$ in 255 steps of $1/256 e$. This should be clear from Equation 10 where the ratio $R_0/R$ is now 1 and recognizing that resistor 40-9 of value $256r$ is always in the circuit. As an example, consider that $e_0$ is to equal $5/256 e$. By putting the binary "4" and "1" resistors 40-6 and 40-8 in the $R_x$ arm (switches 41-6 and 41-8 up), the reciprocal fraction of (10) becomes $$\frac{1}{256}+\frac{1}{64}=5/256$$

so that $e_0=5/256 e$. It should be clear that the other switches can be operated to achieve the desired $e_0$ in steps of $1/256 e$. Thus, the network of binary weighted resistors of FIGURE 4 satisfies the conditions for network 10.

It should be understood that the switches 41 of the voltage divider 10 of FIGURE 4 are actuated by control knob 16 in any desired sequence and the calibrating scale 17 is provided. Switches 41 also may be driven by a binary output device which automatically switches the various resistors in accordance with a binary computer type program.

FIGURE 5 shows an equivalent circuit for the bridge of FIGURE 4. Here, the binary weighted resistors 40 are indicated by the weighted fraction $r/X$ and $r/1-X$ where $r$ is again the output impedance of network 10 and X is the voltage division ratio. The resistors comprising $r/X$ are those of FIGURE 4 switched into the $R_x$ arm between terminals 1 and 3 by placing a corresponding switch 41 "up." The resistors comprising $r/1-X$ are those of FIGURE 4 placed into the $R_y$ arm between terminals 2 and 3 by placing a corresponding switch "down." The balance equation of the bridge of FIGURE 5, and therefore of FIGURE 4, is given by:

(11) $$R_R=\frac{R_A+R_B}{R_B}R_CX-(R_C+r)$$

In more general terms (11) can be written as:

(11a) $$Z_R=\frac{Z_A+Z_B}{Z_B}Z_CX-(Z_C+r)$$

In (11) and (11a) all quantities on the right hand side are known, with the exception of X which is readable from the scale 17. As before, $(Z_C+r)$, or $(R_C+r)$, is the offset.

While the offset factor of Equations 11 and 11a is not harmful, it is desirably eliminated to make calibration of scale 17 easier and more accurate. FIGURE 6 shows one arrangement for eliminating the offset factor in an AC bridge. Here an impedance equal to $Z_Z=(Z_C+r)$ is inserted in series with the unknown $R_R$. At balance, from (11a):

(12) $$Z_R+Z_Z=\frac{Z_A+Z_B}{Z_B}Z_CX-(Z_C+r)$$

since $Z_R$ and $Z_Z$ are now in the bridge arm including divider 10. Making $Z_Z=Z_C+r$, and of opposite reactance such as an inductor for $Z_C$ and a capacitor for $Z_C$ or vice versa, equalizes the offset. Therefore (12) becomes

(13) $$Z_R=\frac{Z_A+Z_B}{Z_B}Z_CX$$

from which $Z_R$ may be easily determined. The operation of this type of bridge is described with respect to FIG. 8. It should be understood that when the values of $Z_A$, $Z_B$ and $Z_C$ are changed to vary the operating range of the bridge, in any of the embodiments, so that the value of $Z_Z$ also must be changed accordingly to make $Z_Z=(Z_C+r)$ in FIG. 6.

Alternative forms of offset correction may be used such as shown in FIG. 6A, which illustrates a resistance bridge, although the same principles generally apply for any impedance bridge. When $Z_R$ is equal to zero, the transfer ratio of divider 10 is also zero so that $Xe$ equals zero and $r$ is in parallel with $Z_C$. By choosing $Z_A$, $Z_B$, $Z_C$, $Z_Z$ and $r$ such that $$Z_ZZ_B=Z_A\frac{rZ_C}{r+Z_C}$$

which in the balance equation of the product of the cross arms with $Z_R=0$, there is no offset. With these values used, the scale therefore reads linearly in terms of X and $Z_R$ of all values of $Z_R$ up to $Z_{Rmax}$ without an offset. For example, with $Z_R=Z_{Rmax}$ the transfer ratio $X=1$ so that $r$ is in parallel with $Z_Z$. In this case, at balance $$Z_AZ_C=Z_B\left[Z_{Rmax}+\frac{rZ_Z}{r+Z_Z}\right]$$

from which $$Z_{Rmax}=\frac{Z_AZ_Cr+Z_AZ_CZ_Z-Z_BZ_Zr}{Z_B(r+Z_Z)}$$

FIGURE 7 shows another form of divider 10 which can be used in accordance with the present invention. This divider has a number of resistors 50-1 through 50-8 each of value $2r$ having one end connected to the movable arm of a respective corresponding numbered single pole double throw switch 51-1 through 51-8. Switches 51 selectively connect a respective resistor 50 to either terminal 1 or 2 of the divider. Adjacent pairs of resistors 50 are connected by a resistor 52 of value $r$. A resistor 50–0 of value $2r$ is permanently connected from terminal 2 of the divider to the junction of resistors 50–1 and 52–1 while a resistor 50–9 of value $2r$ is permanently connected across terminals 2 and 3.

The value $R_0$ of the network of FIGURE 7 with input terminals 1 and 2 shorted is $\frac{2}{3}r$ independent of the setting of switches 51. Thus, one of the conditions of constant output impedance irrespective of the settings of switches 51 is satisfied by the network of FIGURE 7.

The voltage division ratio for each branch formed by a resistor 50 and 52 is $e/3$ since the current from terminal 2 into a branch divides into an $r$ and a $2r$ resistor. Switches 51–1 through 51–8 respectively correspond to fractional values of 1, ½, ¼ ... ⅟₁₂₈ and by selectively connecting certain of these switches 50 to the "up" position to connect a resistor 50 to terminal 1, any fractional voltage of $e_0 = e/3$ in steps of $1/128$ can be obtained.

Figure 8:
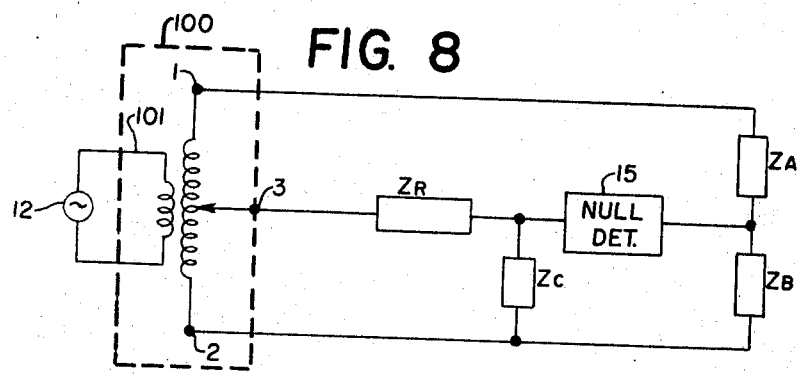

The voltage divider 100 of FIG. 8 represents a type having a negligible output impedance, or a substantially zero output impedance, which is constant over its operating range. One commercially available divider of this type suitable for use with the present invention is a variable tap transformer device, indicated by 101, manufactured by Gertsch Products, Inc. under the name Decade Rate Transformer. The balance equation for the bridge of FIG. 8 is the same as that previously discussed with $r$ now being zero or negligible. The offset compensating arrangement of FIG. 6 also may be used. The variable tap transformer device 101 of FIG. 8 can be used in the bridge of FIG. 6.

It should be understood that many varieties of circuits exist and are suitable for the voltage divider network 10, with the several embodiments shown herein being merely exemplary. For many applications decimal or binary decimal resistor weighting is preferable.

In any of the foregoing embodiments of the bridge circuit the overall bridge operating range may be changed by changing the values of $Z_A(R_A)$, $Z_B(R_B)$, and $Z_C(R_C)$, all three of which are known quantities in the balance equation. It should also be obvious that conventional bridge construction techniques can be utilized here so that, for example, a switching arrangement is provided to change the values of the three known $Z_A$, $Z_B$ and $Z_C$ impedances in an easy manner. Also, a pair of accessible terminals, such as terminals 18 in FIGURE 6, are preferably provided so that impedance $Z_R$, whose value is to be measured, can be readily placed into the branch of the bridge circuit formed by $R_C$, $r$ and $R_R$. All of these, and other techniques are highly conventional in the art and no further description thereof is necessary.

While preferred embodiments of the invention have been described above, it will be understood that these are illustrative only, and the invention is limited solely by the appended claims.

What is claimed is:
1. An impedance measuring system for measuring the impedance value of an unknown impedance element comprising:
   a source of voltage,
   first, second and third elements of respective known impedance values connected in series,
   means for applying voltage from said voltage source across two of said first, second and third elements,
   a voltage divider network having;
   (a) first, second and third terminals,
   (b) means adapted for connecting said first and second terminals across said source of voltage,
   (c) and means for linearly varying the voltage division ratio of said divider to produce a correspondingly varying output voltage across said second and third terminals,
   means for connecting said unknown impedance element between said third terminal and said third impedance element,
   and means connected to said second and third elements for measuring the voltage drops thereacross to indicate balance of the system.

2. An impedance measuring system for measuring the impedance value of an unknown impedance element comprising:
   a source of voltage,
   first, second and third elements of respective known impedance values connected in series,
   means for applying voltage from said voltage source across two of said first, second and third elements,
   a voltage divider network having;
   (a) first, second and third terminals,
   (b) means adapted for connecting said first and second terminals across said source of voltage,
   (c) means for linearly varying the voltage division ratio of said voltage divider by varying impedance relationships internal to said divider to produce a correspondingly varying output voltage across said second and third terminals and a substantially constant output impedance of a known value at said second and third terminals irrespective of the impedance relationships internal to the divider,
   means for connecting said unknown impedance element between said third terminal and said third impedance element,
   and means connected between the junction of said first and second elements and the junction of said third and unknown elements for measuring the voltage drops across two of said elements to indicate balance of the system.

3. An impedance measuring system as set forth in claim 2 and further comprising a scale for said voltage divider to indicate the voltage division ratio between the input voltage at said first and second terminals and the output voltage at said second and third terminals.

4. An impedance measuring system as set forth in claim 3 wherein said known output impedance is substantially negligible over the operating range of the divider.

5. An impedance measuring system for measuring the impedance value of an unknown impedance element comprising:
   a source of voltage,
   first, second and third elements of respective known impedance values connected in series,
   means for applying voltage from said voltage source across two of said first, second and third elements,
   a voltage divider network having;
   (a) first, second and third terminals,
   (b) means for connecting said first and second terminals across said source of voltage,
   (c) means for linearly varying the voltage division ratio of said voltage divider by varying impedance relationships internal to said divider to produce a correspondingly related output voltage across said second and third terminals and a constant output impedance of a known value at said second and third terminals irrespective of the impedance relationships internal to the divider,
   (d) a scale to indicate the voltage division ratio of said voltage divider,
   means adapted for connecting said unknown impedance element between said third terminal and said third impedance element,
   a fifth impedance element connected to the voltage source to produce a voltage drop thereacross of a magnitude such that the scale indicates zero when an unknown element of zero impedance is being measured,
   and means connected to said second and third elements for measuring the voltage drops thereacross to indicate balance of the system.

6. A system as set forth in claim 5 wherein said fifth impedance element is connected in series with said third terminal and said impedance element of unknown value.

7. A system as set forth in claim 5 wherein said fifth impedance element is connected across said first and third terminals.

8. An impedance measuring system for measuring the impedance value of an unknown impedance comprising: a source of voltage first and second impedance elements connected in series to form a first branch circuit of said system, means for applying voltage from said source across said first branch circuit, a voltage divider having three terminals, means for applying voltage from said source across the first and second terminals of said voltage divider, means for linearly changing the voltage division ratio of said divider to produce a correspondingly changing output voltage at the third terminal of the divider and one of the other two terminals, the output impedance of said divider at said third terminal being substantially constant irrespective of the voltage division ratio of the divider, third and fourth impedance elements, means for connecting said third and fourth elements and the output impedance of said divider in series with one of said first and second terminals to form a second branch circuit, and means connected between said first and second branch circuits to determine the voltage drop across an element in each branch circuit to indicate balance of the system.

9. An impedance measuring system for measuring the impedance value of an unknown impedance comprising a source of voltage, first and second impedance elements connected in series to form a first branch circuit of said system, means for applying voltage from said source across said first branch circuit, a linearly variable ratio voltage divider having three terminals and at least one impedance element internal thereof for producing a corresponding linearly varying output voltage at second and third terminals of said divider in response to an input voltage applied at a first and said second terminals of said divider and a substantially constant output impedance of known value at said third and one of said first and second terminals irrespective of the voltage division ratio of said divider, means for applying voltage from said source across said first and second terminals of said voltage divider, third and fourth impedance elements, means for connecting said third and fourth elements and the output impedance of said divider in series with one of said first and second terminals to form a second branch circuit, and means connected between said first and second branch circuits to determine the voltage drop across an element in each branch circuit to indicate balance of the system.

10. An impedance measuring system for measuring the impedance value of an unknown impedance comprising a source of voltage, first and second impedance elements connected in series to form a first branch circuit of said system, means for applying voltage from said source across said first branch circuit, a linearly variable ratio voltage divider having three terminals and at least one impedance element internal thereof for producing a corresponding output voltage at second and third terminals of said divider in response to an input voltage applied at a first and second terminals of said divider and a substantially constant output impedance of known value at said third and one of said first and second terminals irrespective of the voltage division ratio of said divider, means for applying voltage from said source across said first and second terminals of said voltage divider, a third impedance element, means adapted for connecting said third impedance element and said unknown impedance element in series with said third terminal of said divider to form a second branch circuit of said system, and means connected between said first and second branch circuits to determine the voltage drop across an element in each branch circuit to indicate balance of the system.

11. An impedance measuring system as set forth in claim 10 wherein said first, second and third elements have known impedance values and the value of said unknown impedance element at a balance condition of the system is proportional to the voltage division ratio of said divider.

12. An impedance measuring system as set forth in claim 11 further comprising means for adjusting the voltage division ratio of said divider and a scale calibrated to indicate the voltage division ratio of said divider.

13. An impedance measuring system for measuring the impedance value of an unknown impedance comprising a source of voltage, first and second impedance elements connected in series to form a first branch circuit of said system, means for applying voltage from said source across said first branch circuit, a linearly variable ratio voltage divider having three terminals and at least one impedance element internal thereof for producing a corresponding output voltage at second and third terminals of said divider in response to an input voltage applied at a first and said second terminals of said divider and a substantially constant output impedance of known value at said third and one of said first and second terminals rrespective of the voltage division ratio of said divider, means for adjusting the voltage division ratio of said divider, a third impedance element, means adapted for connecting said third impedance element and said unknown impedance element in series with said third terminal of said divider to form a second branch circuit of said system, means connected between said first and second branch circuits to determine the voltage drop across an impedance element in each of said branches, and compensating impedance means connected in said second branch circuit for producing a voltage drop thereacross of a magnitude and phase such that the voltage division ratio of the divider is zero when said unknown impedance element has a zero impedance value.

14. An impedance measuring system as set forth in claim 13 wherein said compensating impedance means is connected in series in said second branch circuit and has a value equal to the sum of the impedance values of said third element and said output impedance of said divider.

15. An impedance measuring system as set forth in claim 13 wherein said compensating impedance means is connected between said third terminal and said first terminal of said divider.

16. An impedance measuring system for measuring the impedance value of an unknown impedance comprising a source of voltage, first and second elements of known impedance values connected in series to form a first branch circuit of said system, a third element of known impedance value connected in series with said first and second elements, a voltage divider having three terminals and a plurality of impedance means, means for controlling the effective values of said plurality of impedance means to linearly vary the voltage division ratio of the divider to produce a corresponding linearly varying output voltage at the second and third terminals and a substantially constant output impedance at said third terminal irrespective of the effective values of said impedance means, means for applying voltage from said source across said first branch circuit and said first and second terminals, means for connecting the unknown impedance element in series with said third terminal and said third element to form a second branch circuit for the system, and means connected between the junction of said first and second elements and the end of said third element remote from said first and second elements to determine the voltage drop across a connected element in each branch.

17. An impedance measuring system for measuring the impedance value of an unknown impedance comprising a source of voltage first and second elements of known impedance values connected in series to form a first branch circuit of said system, a third element of known impedance value connected in series with said first and second elements, a voltage divider having three terminals and a plurality of impedance means, means for controlling the effective values of said plurality of impedance means to linearly vary the voltage division ratio of the divider and produce a corresponding linearly varying output voltage at the second and third terminals and a substantially constant output impedance at said third terminal irrespective of the effective values of said impedance means, means for applying voltage from said source across said first branch circuit and said first and second terminals, means for connecting the unknown impedance element in series with said third terminal and said third element to form a second branch circuit for the system, means connected between the junction of said first and second elements and the end of said third element remote from said first and second elements to determine the voltage drop across a connected element in each branch, and compensating impedance means connected in series with said second branch circuit and having a value equal to the negative sum of the impedance values of said third element and the output impedance of said divider to produce a voltage drop thereacross of a magnitude and phase such that the voltage division ratio of the divider is zero when an unknown impedance of zero value is being measured.

18. An impedance measuring system for measuring the impedance value of an unknown impedance comprising first and second elements of known impedance values connected in series to form a first branch circuit of said system, a third element of known impedance value connected in series with said first and second elements, a voltage divider having three terminals and a plurality of impedance means, means for controlling the effective values of said plurality of impedance means to linearly vary the voltage division ratio of the divider and produce a linearly varying output voltage at the second and third terminals and a substantialy constant output impedance at said third terminal irrespective of the effective values of said impedance means, means for applying voltage from said source across said first branch circuit and said first and second terminals, means for connecting the unknown impedance element in series with said third terminal and said third element to form a second branch circuit for the system, means connected between the junction of said first and second elements and the end of said third element remote from said first and second elements to determine the voltage drop across an element in each of said branches, and compensating impedance means connected between said first and third terminals of said divider and having a value to produce a voltage drop thereacross of a magnitude such that the voltage division ratio of the divider is zero when an unknown impedance of zero value is being measured.

19. An impedance measuring system for measuring the impedance value of an unknown impedance element comprising:

a source of voltage,
first and second elements of known values connected in series to form a first branch circuit of said system,
a second branch circuit including;
  (a) a third impedance element,
  (b) a voltage divider having a substantially constant output impedance,
  (c) and means for connecting said third impedance element and the unknown impedance element in series with the output terminals of said voltage divider,
means for applying voltage from said source across said first and second branch circuits,
and means connected to said first and second branch circuits to determine the voltage drops across an element in each of said branch circuits.

20. An impedance measuring system for measuring the impedance value of an unknown impedance element comprising:

first and second elements of known values connected in series to form a first branch circuit of said system,
a second branch circuit including
  (a) a third impedance element,
  (b) a variable ratio voltage divider having input and output terminals and a plurality of impedance means,
  (c) means for connecting the impedance means of said voltage divider to linearly vary the output voltage said output terminals in response to a voltage applied at said input terminals and produce a substantially constant output impedance at said output terminals,
  (d) and means for connecting said third impedance element and the unknown impedance element in series with the output terminals of said voltage divider,
means for applying voltage from said source across said first and second branch circuits,
and means connected to said first and second branch circuits to determine the magnitude of the voltage drop across an impedance element in each branch.

References Cited

UNITED STATES PATENTS 2,457,165  12/1948  McNamee _____ 323—75
3,320,526  5/1967  Julie _____ 324—57

FOREIGN PATENTS 1,003,884  9/1965  Great Britain.

RUDOLPH V. ROLINEC, *Primary Examiner.*

E. E. KUBASIEWICZ, *Assistant Examiner.*

U.S. Cl. X.R.

323—75